United States Patent [19]
Glass et al.

[11] Patent Number: 5,720,339
[45] Date of Patent: Feb. 24, 1998

[54] REFRACTORY-COMPOSITE/HEAT-PIPE-COOLED LEADING EDGE AND METHOD FOR FABRICATION

[76] Inventors: David E. Glass, 1 Cushings Post, Hampton, Va. 23669; Charles J. Camarda, 3905 Whooping Crane Cir., Virginia Beach, Va. 23445; Michael A. Merrigan, P.O. Box 516, Santa Cruz, N. Mex. 87567

[21] Appl. No.: 410,959

[22] Filed: Mar. 27, 1995

[51] Int. Cl.$^6$ ............................................. F28D 15/00
[52] U.S. Cl. .................. 165/104.26; 165/180; 165/136; 165/168; 165/DIG. 134; 416/96 R
[58] Field of Search ............................ 165/104.14, 180, 165/133, 41, 104.26, 171, 136, 168, DIG. 134; 244/158 R; 416/96 R; 29/890.032

[56] References Cited

U.S. PATENT DOCUMENTS

| | | | |
|---|---|---|---|
| 4,098,261 | 7/1978 | Watt | 165/171 X |
| 4,161,212 | 7/1979 | Hightower | 165/171 X |
| 4,217,954 | 8/1980 | Vincent | 165/180 X |
| 4,671,348 | 6/1987 | Nsurt | 165/41 |
| 4,702,439 | 10/1987 | Kelley et al. | 244/158 A |
| 4,793,404 | 12/1988 | Hata | 165/104.26 |
| 4,838,346 | 6/1989 | Camarda et al. | 165/104.14 |
| 4,852,645 | 8/1989 | Coulon et al. | 165/180 |
| 4,880,052 | 11/1989 | Meyer, IV et al. | 165/104.14 |
| 4,966,229 | 10/1990 | Senterfitt et al. | 165/41 |
| 4,998,584 | 3/1991 | Foglesonger et al. | 165/171 |

FOREIGN PATENT DOCUMENTS

| | | | |
|---|---|---|---|
| 0111157 | 8/1979 | Japan | 165/171 |
| 0165894 | 12/1981 | Japan | 165/104.14 |
| 0022891 | 2/1983 | Japan | 29/890.032 |
| 0113922 | 6/1984 | Japan | 28/890.032 |
| 5248778 | 9/1993 | Japan | 165/104.14 |

OTHER PUBLICATIONS

Niblock, G.A; Reeder, J.C.; and Huneidi, F: Four Space Shuttle Wing Leading Edge Concepts. Journal of Spacecraft and Rockets, vol. 11, No. 5, May 1974, pp. 314–320.

Camarda, C.J.; and Masek, R.V.: Design, Analysis and Tests of a Shuttle–Type Heat–Pipe–Cooled Leading Edge, Journal of Spacecraft and Rockets, vol. 18, No. 1, Jan.–Feb., 1981.

Boman, B; and Elias, T: Tests on a Sodium/Hastelloy X Wing Leading Edge Heat Pipe for Hypersonic Vehicles. Jun. 1990, AIAA–90–1759.

Wojcik, C; and Clark, L: Design, Analysis, and Testing of Refractory Metal Heat Pipes using Lithium as the Working Fluid: Jun., 1991, AIAA–91–1400.

Rovang, R.D.; and Juhasz, A.J.: Carbon–Carbon Heat Pipe Testing and Evaluation, AIAA–94–4065–CP.

Rovang, R.D.; and Dirling, R.B.; and Holzl, R.A.: Carbon–Carbon Heat Pipe Fabrication and CVD Coating Development. Proceedings of the 25th Intersociety Energy Conversion Engineering Conf., vol. 2, Reno, NV, 1990.

*Primary Examiner*—John Rivell
*Assistant Examiner*—Christopher Atkinson

[57] ABSTRACT

A thermal protection system containing several innovative features has been developed with heat pipes embedded in a composite material. The techniques used in the fabrication of the heat pipes permit a smaller radius and a higher use temperature heat pipe than could be manufactured under pervious techniques. The techniques used to embed the heat pipes in a refractory composite material yield a light weight leading edge that is able to tolerate the thermal stresses generated by the difference in thermal expansion between the heat pipes and the composite material. The heat pipes for the leading edge have a "J-shape", and are placed so that the long leg of the heat pipe alternates between the upper and lower surfaces. A coating is placed on the heat pipes that protects the heat pipe from oxidation and reaction with the components of the composite material. A compliant layer is placed between the heat pipes and the composite material to reduce the effects of the thermal stresses that arise due to the mismatch of thermal expansion between the heat pipe and the composite material. A gap forming layer may also be placed between the heat pipe and the composite material so that after it is removed or shrunk, a small gap will be left that will reduce thermal stresses.

5 Claims, 7 Drawing Sheets

Figure 7

REFRACTORY-COMPOSITE/HEAT-PIPE-COOLED LEADING EDGE AND METHOD FOR FABRICATION

ORIGIN OF THE INVENTION

The invention described herein was made under contract to the United States Government and may be manufactured and used by or for the United States Government for government purposes without the payment of any royalties thereon or therefore.

BACKGROUND OF THE INVENTION

This invention relates to the thermal protection of heated regions of high-speed vehicles, and specifically to the use of high-temperature refractory-metal heat pipes embedded in a composite material for transferring heat from regions of high heat input to regions of lower heat input, resulting in a structure with a small thermal gradient. The innovations disclosed in this invention permit the successful fabrication of a heat-pipe-cooled leading edge that will operate at higher temperatures than previously achievable.

Stagnation regions, such as nose caps, and wing, tail, and engine leading edges, are critical design areas of hypersonic vehicles because of the hostile thermal environment they experience during flight. The high local heating and aerodynamic forces cause very high temperatures, severe thermal gradients, and high stresses. In addition, as a hypersonic vehicle travels through the earth's atmosphere, the stagnation regions are subjected to a potentially severe oxidation and erosion environment. A further concern is that thermal-structural distortions may be large enough to interact with the fluid flow and cause coupling between the fluid, thermal, and structural responses.

Design considerations for hypersonic vehicles can become extremely complex as the disciplines involved in the analysis and design of the vehicle become coupled. An air-breathing, single-stage-to-orbit vehicle is subjected to severe aerothermal and acoustic loading; and yet many diverse, and often conflicting, design requirements must be satisfied. Mass is of critical importance to any hypersonic vehicle, but is of particular importance if the vehicle travels to orbit. The selection of the structural concepts, materials, and, if necessary, method of cooling (passive, ablative, active, and "semi-active" or heat-pipe cooling) strongly influences vehicle mass. The structural concepts and materials selected must satisfy structural, thermal, material, environmental expose, and manufacturing requirements. Additional performance requirements such as operability, reusability, reliability, and redundancy often complicate lightweight solutions to the design problem.

A heat pipe is a self-contained, two-phase heat transfer device which is composed of a container, a wick, and a working fluid. Heat input locally to one section of the heat pipe, the evaporator region, is conducted through the container and into the wick/working-fluid matrix, where it is absorbed by the evaporation of the working fluid. The heated vapor flows to a slightly lower pressure region of the heat pipe where the working fluid condenses and gives up its stored heat. The heat is then conducted through the wick/working-fluid matrix and container and is rejected. The location of the heat pipe where heat is rejected is called the condenser region. The cycle is completed with the return flow of liquid condensate back to the heated region (evaporator) by the capillary pumping action of the wick. During normal operation, heat pipes operate as devices of very high effective thermal conductance and maintain a nearly uniform temperature over the entire heat-pipe length.

Applied to the heating of high-speed vehicles, heat pipes transport the high net heat input in one region to cooler aft surfaces, raising the temperature there above the radiation equilibrium temperature. The location and extent of the evaporator and condenser regions, which are by definition areas in which there is a net inflow or outflow of heat, respectively, is dependent upon the magnitude and distribution of heating and will vary to satisfy an overall energy balance.

DESCRIPTION OF RELATED ART

Several concepts are available for the thermal protection of vehicle leading edges. These concepts can be divided into three categories: 1) passive (no working fluid to remove the heat), 2) active (external system provides working fluid to remove the heat), and 3) semi-passive (working fluid removes the heat, but no external systems are needed to provide or circulate the fluid).

Passive thermal protection systems include heat sink structures, hot structures, and insulated structures. In a heat sink structure, the structure absorbs nearly all the incident heat and stores it in the structure. In a hot structure, the structure is allowed to reach the radiation equilibrium temperature where the heat radiated away equals the incident heat. In an insulated structure, the insulation prevents most of the heat from reaching the structure below.

Active thermal protection systems include transpiration cooling, film cooling, and convective cooling. Transpiration cooling involves ejecting a coolant through a porous surface, and film cooling involves ejecting a coolant parallel to the surface. In both cases, the coolant blocks much of the incident heat. Convective cooling involves circulating a coolant through the structure to remove the heat absorbed by the structure.

Semi-passive thermal protection systems include ablators and heat pipes. Ablators undergo a chemical reaction which consumes the ablator to generate gases that block much of the incident heat. Heat pipes transfer heat by the evaporation and condensation of a working fluid.

The concept of using heat pipes as a thermal protection system for leading edges began with analytical studies in the 1970's and has continued to the present. In the early 1970's, several feasibility studies were performed to assess the application of heat pipes for cooling leading edges and nose caps of hypersonic vehicles. NASA Langley Research Center analytically verified the viability of heat pipes for cooling stagnation regions of hypersonic vehicles. In 1972, McDonnell Douglas Astronautics Co. (MDAC) compared four space shuttle wing-leading-edge concepts (Niblock, G. A.; Reeder, J. C.; and Huneidi, F.: Four Space Shuttle Wing Leading Edge Concepts, Journal of Spacecraft and Rockets, Vol. 11, No. 5, May 1974, pp. 314–320): a passive carbon/carbon concept, a passive coated-columbium concept, an ablative concept, and a liquid-metal/superalloy heat-pipe-cooled concept. The heat-pipe-cooled concept was determined to be a feasible and durable design concept, but was slightly heavier than the other candidate concepts.

In contrast to the study of heat-pipe-cooled leading edges, the actual fabrication of heat-pipe-cooled leading edges is quite limited and differs in significant ways from the current invention. In 1973, MDAC fabricated two all metallic half-scale shuttle-type heat-pipe-cooled leading edges to verify feasibility of the concept. One of these specimens was tested by a series of radiant heat and aerothermal tests at NASA Langley Research Center from 1977 to 1978 to verify heat-pipe transient, startup, and steady-state performance (Camarda, C. J.; and Masek, R. V.: Design, Analysis, and Tests of a Shuttle-Type Heat-Pipe-Cooled Leading Edge, AIAA 81-4020). This differed from the current invention in that it: a) was an all metallic leading edge, b) had a large leading-edge radius, c) had no artery, d) had no strain isolators, e) had full length heat pipes on the top and bottom surfaces. In 1986, MDAC received a contract to fabricate and build a sodium/superalloy heat-pipe-cooled leading-edge component for an advanced shuttle-type vehicle (Boman, B.; and Elias, T.: Tests on a Sodium/Hastelloy X Wing Leading Edge Heat Pipe for Hypersonic Vehicles, Presented at the AIAA/ASME 5th Joint Thermophysics and Heat Transfer Conference, Jun. 18–20, 1990, Seattle, WA, AIAA-90-1759). This advanced shuttle-type heat pipe was six-feet long and was tested at MDAC by radiant heating and at Los Alamos National Laboratory by induction heating. This heat pipe differed from the current invention in that it: a) was a single, all metallic heat pipe, b) had a large leading-edge radius, c) had no strain isolators, d) had no artery, and e) was designed for all J-shaped heat pipes along the top surface of the wing only. In the current invention, J-shape heat pipes are alternated between the upper and lower surfaces, whereas in Boman and Elias, the J-shaped heat pipes were all oriented in the same direction. J-shaped heat pipes alternate between the upper and lower surfaces to reduce weight, while at the same time maximizing the radiative surface area and the heat-pipe density in the stagnation region. Teledyne Wah Chang (Wojcik, C.; and Clark, L.: Design, Analysis, and Testing of Refractory Metal Heat Pipes Using Lithium as the Working Fluid, AIAA 26th Thermophysics Conference, Honolulu, Hawaii, Jun. 24–26, 1991, AIAA Paper 91-1400) fabricated a single, straight refractory metal (niobium) heat pipe and then bent it into the shape of a leading edge. It differed form the current invention in that: a) it was all metallic, b) had a large leading-edge radius, c) had no strain isolators, and d) had no J-shaped heat pipes. None of the leading-edge shaped heat pipes mentioned here were embedded in a composite material, and thus did not experience the difficulties of doing such, i.e., no strain isolators were required. In addition, the leading-edge radius was large relative to the heat-pipe hydraulic diameter, and the materials used were not the higher temperature refractory metals. The niobium heat pipe of Wojcik, et at., does not have the temperature capability of the heat pipe in the present invention. Though a J-shaped heat pipe was used in one case, it was not alternated between the upper and lower surfaces to optimize heat transfer and reduce weight.

Straight refractory-metal heat pipes have been fabricated and embedded in monolithic chemically vapor deposited (CVD) silicon carbide (SIC) by both Thermo Electron and Los Alamos National Laboratory. In both cases, the heat pipes were straight and no strain isolators were used. The heat pipes were not coated to protect the heat-pipe material from interaction with the SiC. The innovative fabrication techniques disclosed herein were not necessary for the straight heat pipes. Rockwell, under a NASA Lewis contract, fabricated a carbon/carbon (C/C) heat pipe for use in space radiators (Rovang, R. D; and Juhasz, A. J.: Carbon-Carbon Heat Pipe Testing and Evaluation, AIAA-94-4065-CP, and Rovang, R. D.; Dirling, R. B. Jr.; and Holzl, R. A.: Carbon-Carbon Heat Pipe Fabrication and CVD Coating Development, Proceedings of the 25th Intersociety Energy Conversion Engineering Conference, Vol. 2, Reno, Nev., 1990). For their heat pipe, the inside of a C/C tube was coated with a metallic material to contain the heat-pipe working fluid. The metallic layer is a liner, rather than a container. They place a metallic layer between the C/C and the liner to grade the coefficient of thermal expansion (CTE) mismatch. The approach of grading the CTE is different from the approach of the current invention where a strain isolation system is used. The metallic layer between the C/C tube and the liner protected the inner liner from reacting with the C/C structure, but no attempt was made to protect the heat pipe from oxidation. Finally, the innovative fabrication techniques disclosed herein were not necessary for the straight heat pipes.

Camarda, et al., (U.S. Pat. No. 4,838,346) (hereinafter "Camarda") discloses the use of refractory-metal heat pipes embedded in C/C. Camarda limits his invention to C/C material and to use temperatures of 3000° F. for oxidizing environments and above 3000° F. for non-oxidizing environments or inert atmospheres. He also fails to disclose strain isolators between the heat pipe and the composite material, nor does he propose coating the heat pipe to protect it from oxidation and reaction with the composite material in which it is embedded. He also fails to disclose techniques that enable his invention to be fabricated.

The disadvantages of the prior art are:
1) The bending of "D-shaped" cross-section tubes restricts the size of the leading-edge radius relative to the heat-pipe hydraulic diameter. Small leading-edge radii relative to the heat-pipe hydraulic diameter cannot be bent without buckling the heat-pipe container and wick structure.
2) Bending of heat pipes is limited to ductile high-temperature materials such as niobium. Bending to obtain small leading-edge radii will not be successful with higher temperature materials such as molybdenum or tungsten due to their mechanical properties. Rhenium, another high-temperature material, has sufficient ductility for bending, but work hardens easily, and must be annealed frequently. The numerous annealing leads to grain growth which is detrimental to the prolonged use of the heat pipe.
3) Full length heat pipes on either or both the upper and lower surface creates a weight penalty due to the excess heat-pipe length that is not needed away from the highly heated nose section.
4) Wick fabrication has not allowed curved heat pipes which rely on arteries to assist liquid flow to be fabricated around small leading-edge radii.
5) Large thermal stresses generated due to the mismatch of the coefficient of thermal expansion between the heat pipe and composite material in which it is embedded prevented heat pipes from surviving being embedded in composite materials.
6) Large thermal stresses are generated in actively cooled leading edges due to the large temperature differences between the heated surfaces and the cooled heat exchangers.

A typical heat-pipe-cooled leading edge based on the present disclosure comprises heat pipes embedded in a composite material. Coatings may be beneficial on the inner and outer surface of the leading edge to protect the composite material from oxidation and on the outside surface of the heat pipe to protect the heat pipe it from oxidation and reaction with the composite material. Strain isolators may be beneficial between the composite material and the heat pipe to reduce the stress and strain generated due to a difference in thermal expansion of the two materials. The advantages of the present invention over the prior art are:
1) Due to the drawing, machining, and joining techniques disclosed herein, heat pipes with small leading-edge radii can be fabricated from higher use temperature materials than can be fabricated by bending the heat-pipe container.
2) The heat-pipe fabrication techniques disclosed herein permit the use of higher use temperature materials than would be possible if bending the heat pipe was the only method available for fabricating a heat pipe with a small leading-edge radius.

3) A reduction in the weight of the leading edge due to the use of "J-shaped" heat pipes with the long leg alternating between the upper and lower surface, while not reducing the heated surface area. Since the heating in the nose region is much higher than regions aft of the nose, the spacing between heat pipes needs to be much smaller in the nose region, but can be less aft of the nose.
4) The use of a compliant layer between the heat pipe and the composite material which reduces the thermal stresses that arise due to the mismatch in the coefficient of thermal expansion of different materials.
5) The use of a gap forming layer between the heat pipe and the composite material that will survive the fabrication temperatures of the composite, but can be removed prior to maximum use temperatures of the leading edge, for the purpose of creating a small gap between the heat pipe and the composite material that will reduce thermal stresses.
6) The use of a gap forming layer between the heat pipe and the composite material that will shrink during the fabrication of the composite for the purpose of creating a small gap between the heat pipe and the composite material that will reduce thermal stresses.
7) The use of an arterial wick in a curved section of the heat pipe which permits the use of heat pipes in the nose region of leading edges.
8) Internal radiative cooling in a leading edge, which eliminates thermal stress problems associated with active cooling of the leading edge.
9) A heat-pipe cross section with a slight outward bow on the "flat" surface to reduce the chances of buckling while at the same time maintaining a large surface area for heat transfer into the heat pipe.

SUMMARY OF THE INVENTION

The object of the present invention is a thermal protection system consisting of refractory-metal heat pipes embedded in a composite material leading edge with strain isolators between the heat pipe and the composite material and coatings on the heat pipe. The current invention is lighter weight than prior art due to alternating the long leg of the heat pipe between the upper and lower surface, thus reducing weight while at the same time not significantly hindering heat transfer. The innovative fabrication techniques disclosed herein allow the fabrication of a heat-pipe-cooled leading edge capable of operating at higher temperatures than allowed by existing techniques.

According to the invention disclosed herein, straight "D-shaped" cross-section tubes are first fabricated with a slight bow outward on the otherwise flat surface. The tubes serve as the heat-pipe container on the upper and lower surfaces. The leading-edge-shaped heat pipes are then fabricated by machining a nose section in two parts and joining the parts together after a similarly shaped wick has been inserted into the straight portion of the heat-pipe container. The heat pipes can be fabricated into a "J-shape", with one leg longer than the other. The leading-edge-shaped wick, fabricated to near net shape prior to insertion into the heat-pipe container, may be fabricated with an artery. The wick may be fabricated from either a fine mesh screen or from sintered metal powders. The heat pipe is coated with a coating to reduce both the oxidation of the heat-pipe container and the reaction of the composite material with the heat-pipe container. Once protected from the surrounding environments (oxygen and composite material), the heat pipes can be embedded in a composite material with a strain isolator placed between a portion of the heat pipe and the composite material. In addition, a gap forming layer can be placed between the heat-pipe container and the composite material that can be removed after the densification process by methods such as, but not limited to, sublimation, evaporation, pyrolysis, or etching. The "J-shaped" heat pipes may be placed so that the long leg of the heat pipe alternates between the upper and lower surface. Alternating the heat pipes results in heat pipes spaced close together in the nose region where the heat flux is high, and heat pipes spaced further apart on the upper and lower surfaces where the heat flux is much lower. After the carbon preform is densified, the surface of the composite material is coated with an oxidation protection coating on both the inside and outside of the leading edge. If the total heat input is greater than what can be radiated away by the outer surface, internal radiative cooling may be included to augment the heat removal. In this case, an actively cooled heat-exchanger panel can be located inside the leading edge and attached to the wing box behind the leading edge. The use of internal radiative cooling eliminates the need for attaching a cooled heat exchanger to a hot internal leading edge, which would result in large thermal stresses.

DESCRIPTION OF THE PREFERRED EMBODIMENTS

Figure 1:
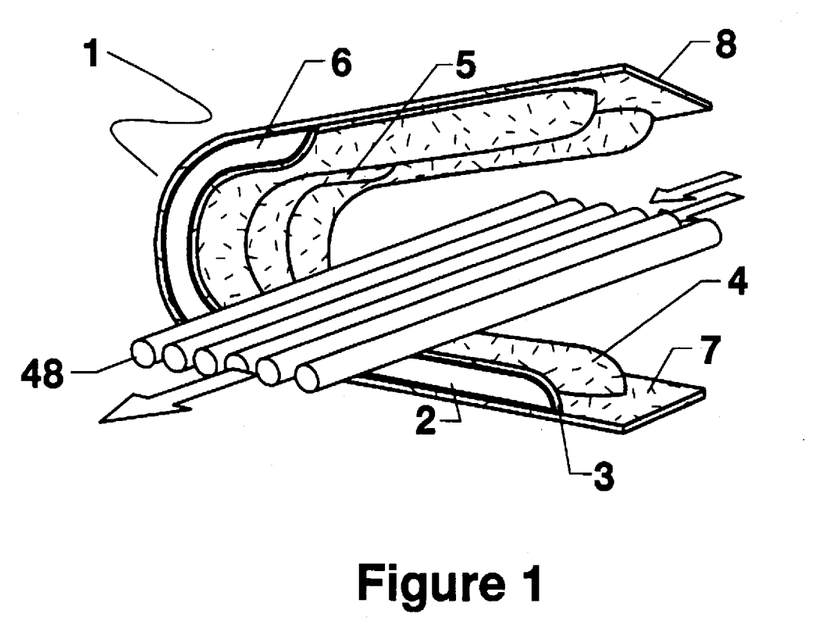
FIG. 1 is a schematic diagram of a heat-pipe-cooled leading edge.

Referring to FIG. 1, a heat-pipe-cooled leading edge 1 comprising at least one heat pipe 2 embedded in a composite material 3 is used for reducing maximum temperatures on high-speed vehicle leading edges by transferring heat from the stagnation region to the upper 8 and lower 7 surfaces where the heat is radiated away. The leading edge consists of heat pipes with a J-shape, with the long leg 4 alternating between the upper 8 and lower 7 surfaces. Likewise, the short leg 5 and 6 alternates between the upper and lower surface. Internal radiative cooling 48 may be used to assist in the removal of heat from the internal surface. The potential applications for heat-pipe cooling include the wing, vertical and horizontal tails, nose, and engine cowl leading edges as well as other heated surface areas of high-speed aircraft.

Although composite materials are used for illustrative purposes, other materials can also be used even though they may suffer strength reduction at elevated temperatures and may provide weight penalties. The term matrix, in addition to being used to define a component of a composite material in which a second component is embedded (i.e., fibers embedded in a matrix), is also used to refer, on a macro level, to the material within which the heat pipes are embedded (i.e., heat pipes embedded in a matrix). Thus, the term matrix is also used to refer to the material that provides structural support for the heat pipes. In addition to the traditional multi-component composite materials, matrix herein can also refer to any materials in which the heat pipes are embedded, such as metals, ceramics, metallic alloys, polymers, and glasses. The choice of materials for use in the heat pipes depends on the maximum anticipated operating temperature. The material chosen for the preferred embodiment is a refractory metal alloy, molybdenum-rhenium (Mo—Re), for both the heat-pipe container and wick. Though it is not essential, it is preferable to use the same material for the heat-pipe container and wick. Two important factors in the choice of the material are the ductile-brittle-transition temperature (DBTT) and the ability to join the heat-pipe container components. It is preferable to have a heat-pipe container that is not brittle at room temperature, i.e., it is desirable to have a DBTT less than room temperature. The DBTT of Mo—Re is less than room temperature. Regardless of how the heat pipe is fabricated, some joining is necessary. Mo—Re is a material that can easily be joined to itself and to other materials. Though Mo—Re is the preferred choice for the heat-pipe and wick material, other high-temperature materials may also be used. Some of the other materials that could be used include tungsten, molybdenum, rhenium, niobium, tantalum, iridium, rhodium, ruthenium, and chromium, in either the pure or alloyed state.

Figure 2A:
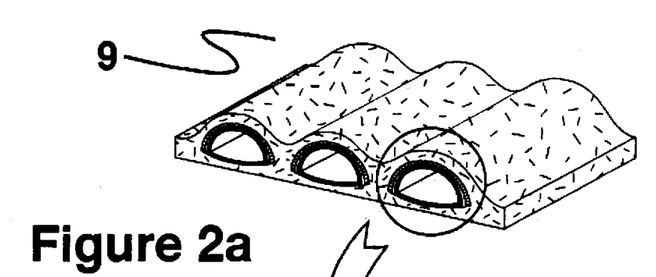
FIG. 2a is a schematic diagram of the preferred embodiment of the cross section of the leading edge.
Figure 2B:
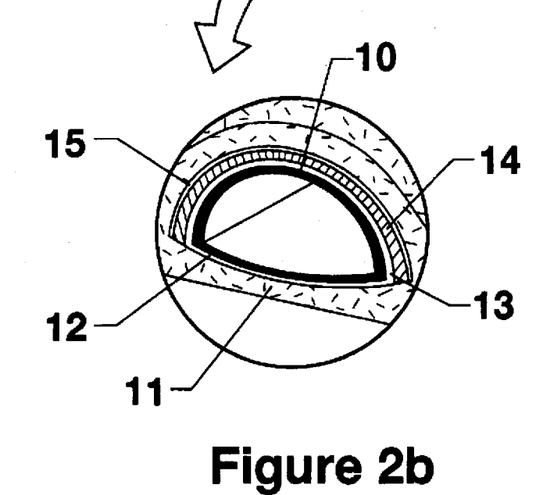
FIG. 2b is an expanded view of a heat pipe embedded in a composite material.

Referring to FIGS. 2a and 2b, the straight portion of the heat-pipe-cooled leading edge 9 consists of straight heat-pipe containers that can be fabricated by drawing tubes with a "D-shaped" cross section 10. In the disclosure herein, the term tube refers to any cross sectional shape, and is not limited to the traditional circular shape. The drawing of thin walled (on the order of 0.01 in.) "D-shaped" tubes that are crack and defect free out of refractory metals requires procedures that start with the preparation of the billet material. A solid rod of the material is first arc cast to a specified dimension. The rod is then gun drilled, resulting in a hollow circular cylinder of specified inner and outer diameters. The inner and outer diameters of the material during drawing are important because they are related to the area reduction between each drawing. Tools must be fabricated to reduce the cross sectional area of the rod and at the same time transition from a circular cross section to a "D-shaped" cross section. The area reduction between drawings is between 60–65%. The material is annealed, stress relieved, and recrystallized to obtain the maximum possible ductility. Contamination is eliminated during the stress relief process, and the surface is not oxidized to prevent any surface cracking. The "flat" surface of the tubes 12 is constructed such that it is bowed outward slightly to reduce the possibility of the "flat" surface buckling when embedded in the refractory-composite material. The slight outward bow results in an "initial imperfection" that tends to keep the heat pipe from buckling inward. The slight outward bow is also referred to as a convex surface. In the disclosure herein, the term flat refers to a surface that is flat in at least one direction. Thus, a cylinder, cone, or wing leading edge has a flat surface, but a sphere does not. The convex, or bowed out surface on a D-shaped tube is also referred to as the flat surface of the D-shaped tube. Other techniques, such as forming and joining, chemical vapor deposition, and powder metallurgy are also available for fabricating the tubes.

Figure 5:
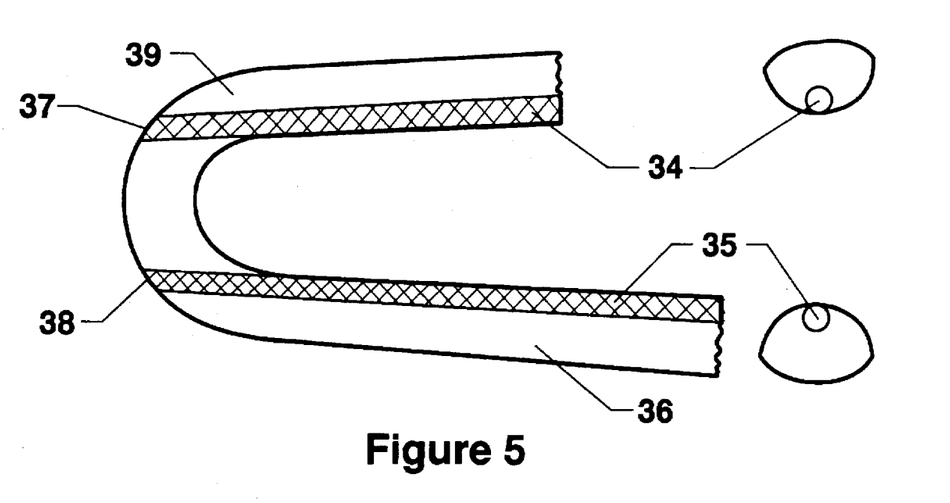
FIG. 5 is a schematic diagram of a wick and artery.

A curved wick must be fabricated for use in the heat pipes. The curved wick can be fabricated by wrapping a screen around a mandrel that has the desired wick inside shape and a groove to accommodate the artery. A predetermined number of layers of screen are wrapped around the mandrel, the artery is placed over the screen and into the groove, the final number of layers of screen are wrapped around the artery and mandrel, and the final layer of screen may be joined in locations to the previous layer by a method such as spot welding. The screen can be wrapped on the bias (at an angle to the axis of the mandrel) to reduce buckling of the wick as it is wrapped around the mandrel in the nose region of the leading edge. Wedge-shaped sections of screen can be cut and removed from the inside radius of the wick to assist in forming the leading-edge shape. After the wick is formed to the leading-edge shape, the wick is cut to the desired length. The wick can also be fabricated by sintering metal powders or small spheres. In either method, the wick can be fabricated to near net shape prior to insertion into the heat-pipe container. Referring to FIG. 5, an artery 34 and 35 can be fabricated by first compressing the screen used for the wick. The compressed screen can then be wrapped around a mandrel and sintered to form an artery. As an alternative, to prevent the need to bend the artery around the nose region of the leading edge, the artery 34 and 35, which is located on the curved, inside surface, can extend straight from the tangent point until it reaches the "flat", or convex, outer portion of the heat pipe in the nose region 37 and 38. The artery will then transport the working fluid directly to the heated surface in the nose region. The above described artery is included on both the long 36 and short 39 legs of the heat pipe.

Figure 4:
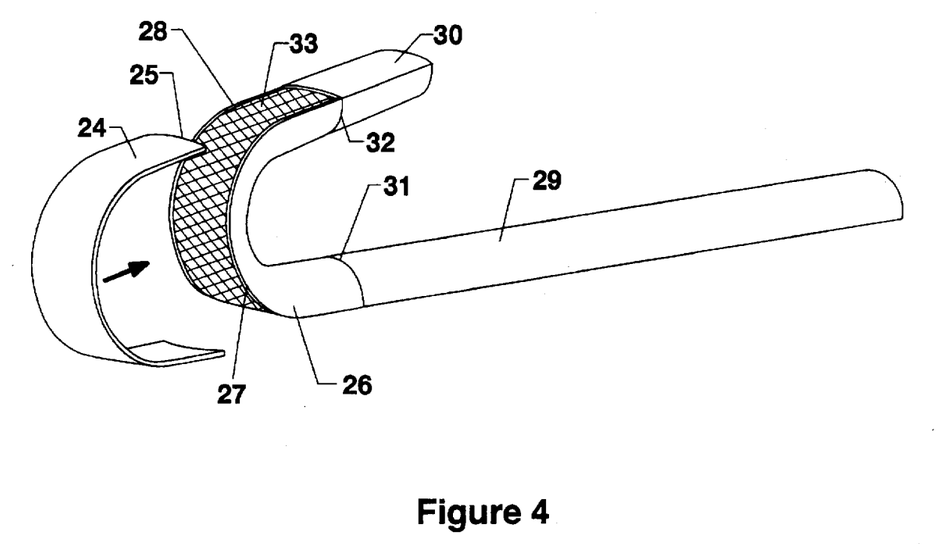
FIG. 4 is a schematic diagram of the components of a "J-shaped" heat pipe.

Referring to FIG. 4, the curved nose portion of the heat pipe may be fabricated by obtaining a section of the material to be used from which the outside surface 24 and the inside surface 26 can be machined. Machining of the two parts 24 and 26 can take place by electrode discharge machining (EDM) or by a conventional machining technique. One of the first steps in designing the nose portion is to produce a design that minimizes the amount of joining. In the disclosure herein, the term joining refers to connecting two objects together by any of several available techniques such as, but not limited to, welding, brazing, or bonding. The proposed design minimizes the joining lengths 25 and 27 while permitting the curved wick 33 to be inserted into the "D-shaped" tubes 29 and 30 prior to joining. Joining the thin walled tubes and providing and maintaining a leak-free joint is not a trivial task. The joints 25, 27, 28, 31, and 32 must result in a hermetically sealed heat pipe but not adversely affect the material properties. In addition, if heat is used in the joining process, the heated region should remain small to not result in a large heat affected zone (HAZ) and adversely affect the life of the heat pipe. The curved nose portion can also be fabricated by bending a pre-drawn tube to the desired radius. Finally, it is possible to fabricate the entire heat pipe by chemically vapor depositing (CVD) the heat-pipe container on a formed wick. In this case, the first step is to skin over the wick so that it does not get filled during the CVD process. This can be done by placing either a thin metallic foil or a fine mesh screen on the outside of the wick prior to the CVD process. As an alternative, a process could be used that would cover the outer layer of the wick without filling the inside of the wick.

If the nose section is fabricated by machining and joining the nose components, the "J-shaped" heat pipe can be fabricated by joining a long section 29 and a short section 30 of "D-shaped" cross section tubing to the ends 31 and 32 of the joined nose section. In other than the CVD fabrication technique, once the wick and the straight portion of the heat-pipe container are fabricated, the heat pipe can be assembled. The inner 24 and outer 26 surfaces of the heat pipe in the nose region are positioned over the wick 33 and joined in place. The straight portions of the heat pipe 29 and 30 can then be joined to the nose section. The difficulty in obtaining hermetically sealed joints in thin gage (on the order of 0.01 in.) refractory metals has been overcome in the current invention. Hermetically sealed joints in non-refractory metals (such as nickel based superalloys) have routinely been obtained, but such has not been the case with thin gage higher temperature refractory metals.

Referring to FIG. 2b, it is advantageous to coat the heat pipe with a protective coating to protect the heat pipe from degradation due to both oxidation and reactions with the components of the composite material. The coating 13 may be a silicide-based coating applied by a pack cementation or a slurry process. Depending on the heat-pipe material, it may be advantageous to deposit a thin layer of a silicide forming material such as Mo on the heat pipe. A single coating that protects the heat pipe from all forms of external degradation is desired. However, a layered coating may be necessary, where each coating layer serves a different function. If a silicide coating is used, it may be advantageous to oxidize the coating prior to embedding it in the composite material to obtain a silica layer. In addition to the silicon-based coatings, iridium, rhenium, and the platinum group metals could be used for the coating material. Also, different forms of carbides, nitrides, oxides, or aluminides could be used for the coatings. The coatings may also be applied by techniques such as CVD, sol-gel, physical vapor deposition (PVD), or plasma spray.

Figure 3A:
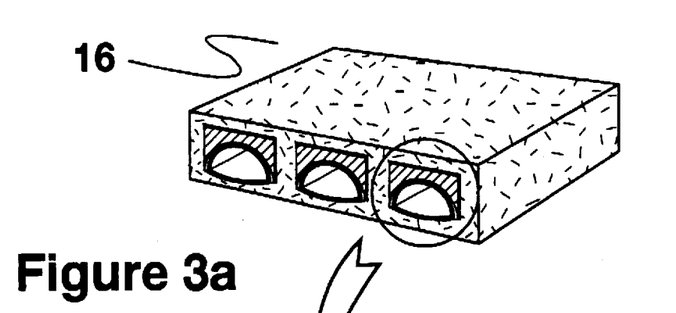
FIG. 3a is a schematic diagram of an alternate embodiment of a cross section of a leading edge.
Figure 3B:
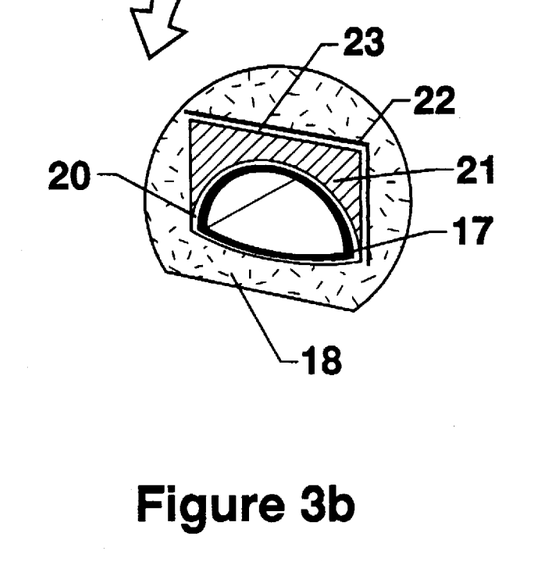
FIG. 3b is an expanded view of an alternate embodiment of a heat pipe embedded in a composite material.

A compliant layer 14, such as soft flexible graphite material or an aerogel, may be necessary between the heat pipe 12 and the composite material 11 in which the heat pipe is embedded. The compliant layer is used to reduce the stresses or strain that arise due to the mismatch in the coefficient of thermal expansion between the heat pipe and the composite material. In the disclosure herein, the term strain isolator refers to any means to reduce the stress or strain generated in one object due to restraint by another object. The strain isolator may be a material such as a compliant layer or may be a gap between the two objects. The compliant layer may be used to reduce the thermal stresses in the radial and/or the axial directions. For the radial direction, it is not necessary for the compliant layer to surround the entire heat-pipe cross-section, but only enough of the heat pipe to reduce the stresses in each direction. Thus, in the preferred embodiment, the compliant layer 14 need only cover the curved portion of the "D-shaped" cross-section. In this way, the compliant layer is not placed between the heat-pipe and the C/C at the heat transfer interface, where the heat transfer interface is defined as the surface where optimum heat transfer is desired. By strategically locating the compliant layer, the compliant layer will reduce stresses both normal to and parallel to the "flat" part of the "D-shaped" cross-section and not interfere with the heat transfer into the heat pipe. It would be possible to use the compliant layer on only half of the "D-shaped" cross-section, i.e., from the side to the top, and not the entire curved surface. Referring to FIG. 3b, an alternate embodiment of the heat-pipe-cooled leading edge 16 uses a concave piece of graphite 21 over the "D-shaped" cross-section 17 heat pipe to form a rectangular cross-section for ease in weaving the fabric preform. The heat pipe again has a protective coating 20. In this case, the compliant layer 22 could be placed on the top and on one side of the rectangular cross section. Again, it is not necessary to place the compliant layer on both sides. The spacer 21 that is used to form a rectangular cross section may also be used as a compliant layer.

The compliant layers 14 and 22 are intended to relieve thermal stresses that arise due to differences in thermal expansion of the heat pipe and the compliant layer. In some cases, the compliant layer may not be able to relieve the stresses to acceptable levels. In these cases, it may be advantageous to also use a gap forming layer 15 and 23 between the heat pipe and the composite materials. A gap forming layer is defined as a layer between the heat pipe and C/C that can be removed after the part is fabricated. The gap forming layer can also be defined as a layer in which the volume is reduced as a result of raising the temperatures, as with pre-ceramic polymers which are converted to ceramics at elevated temperatures, resulting in smaller thicknesses than the original layer. As with the compliant layer, a gap forming layer may be used to reduce thermal stresses in the axial and/or radial directions. The gap forming layer can be used instead of, or in addition to, the compliant layer. One embodiment uses a subliming layer. The key is to use a material that will result in reduced volume when taken above the densification temperature of the C/C. After densification, the removable layer can be removed by heating the entire part, and thus the removable layer, or by locally heating the removable layer. A thin subliming layer is chosen such that it will survive the densification temperatures of the C/C. After the C/C has been fully densified, the subliming layer is still present between the heat pipe and the C/C. However, during subsequent heating of the part to temperatures above the pyrolysis temperature, the removable layer sublimes, and leaves a small gap between the heat pipe and the composite material over the curved section of the heat pipe. The gap would provide a space for the heat pipe to expand into as it is heated. Care must be taken to avoid a large gap that does not close upon expansion. Such a gap would significantly increase thermal contact resistance across the interface. In addition to the sublimation of a gap forming layer, the evaporation, etching, melting, and/or pyrolysis of the gap forming layer would achieve the desired results.

An aerogel may be used as a combination compliant layer and gap forming layer. Aerogels are extremely light weight materials that have more strength in compression than tension. Aerogels have been made from numerous organic and inorganic materials, such as $SiO_2$, $TiO_2$, $ZrO_2$, $Al_2O_3$, resorcinol-formaldehyde, melamine-formaldehyde, polyurethane, and polystyrene. The temperature capability of the aerogel is dependent on the material used. The aerogel would serve as a compliant layer between the heat pipe and the composite material, and would be crushed if the compressive stresses were above its compressive strength. Crushing the aerogel would result in a volume reduction that would relieve the stresses built up in the heat pipe and the composite material. The aerogel would crush, and in doing so, relieve stresses in the heat pipe and the composite material. The difference between using aerogel as a gap forming layer versus those previously disclosed is that the aerogel forms a gap when it is compressed above its compressive strength as opposed to when heated to elevated temperatures.

Residue from the gap forming layer can be removed from the gap by several methods. If a porous material such as C/C is used as one of the materials, any residual gas can escape through the porous material. Any residual liquid can be absorbed by the porous material. The liquid may solidify in the composite material. In some cases, such as if a nonporous material is used in which to embed the heat pipes, it may be necessary to provide a means to remove any residual removable layer. This would include a path for the residuals to escape. After removal of the residuals, the escape path could be sealed.

As an alternative to removing the gap forming layer 15 and 23 by heating the entire component to elevated temperatures, a technique such as a high energy electron beam (HEEB) could be used to locally heat the gap forming layer. Here, the HEEB can be focused on the gap forming layer, and heat it up to a higher temperature than the materials on either side on it. If the gap forming layer is melted, it may wick into the composite material 11 and 18 and leave a small gap between the composite material and the heat pipe. The use of a HEEB would allow energy to be deposited in the gap forming layer without excessively heating up the heat pipes. Since the composite material 11 and 18 can tolerate temperatures much higher than the heat pipe, and the removable layer 15 and 23 can be selectively heated without heating up the heat pipe, the use of a HEEB permits the use of a gap forming layer with a higher melting/sublimation temperature than could otherwise be used. Since the HEEB would be used on only a small portion of the chord length at a time, the heat pipe can be used to remove heat from the heated portion. This will allow the use of a higher energy beam without overheating the heat pipe. A HEEB can also selectively remove desired portions of the gap forming layer.

An alternate gap forming layer is a material that experiences a reduction in volume (shrinkage), and thus thickness, during the fabrication process. One such class of shrinking materials is pre-ceramic polymers, which are converted to ceramics at elevated temperatures with a volume reduction. Examples of pre-ceramic polymers and their ceramic products include, but are not limited to, perhydropolysilazane to $Si_3N_4$, polysilazane to Si—N—C, hydridopolysilazane to Si—N—C, polycarbosilane to SiC, polycarbosiloxane to Si—O—C, and polyvinylsilane to SiC. The pre-ceramic polymer layer will be converted during the densification to a ceramic layer with a smaller volume (and thus thickness). The conversion will result in a gap caused by the shrinkage. Different components of a pre-ceramic polymer are converted to ceramics at different temperatures and with different volume reductions. The pre-ceramic polymers can be modified to yield a desired volume reduction at a desired temperature. Fractionation of the pre-ceramic polymers is a method to separate the different components of the pre-ceramic polymer, and thus obtain a desired volume reduction and gap.

In addition to having a compliant layer between the heat pipes and the composite material to reduce radial stresses, it may also be advantageous for the heat pipes to move axially when axial growth occurs. For this function, a type of lubrication would be desired. In C/C and carbon/silicon-carbide (C/SiC), a thin layer of carbon is deposited on the carbon fibers to serve as a lubricant and to prevent tight bonding between the fibers and the matrix. A soft flexible graphite material, which can be used as a compliant layer, can also serve to prevent the tight bonding between the heat pipe and the composite material on some of the surfaces. On the surfaces where a compliant material is not used, a thin layer of carbon can be deposited to serve a function similar to the carbon layer on the fibers. A compliant layer such as a soft flexible graphite material, or a gap forming layer may be placed at the end of the heat pipe to allow for axial growth.

The heat pipes can be arranged in the composite material in several ways. The preferred embodiment is to use J-shaped heat pipes, which have a long leg 29 and a short leg 30 in addition to the nose section. The long leg 29 of the heat pipes are alternated between the upper and lower surfaces. In this way, there is a high concentration of heat pipes in the nose region, i.e. heat pipes close together, but the heat pipes are spaced further apart on the upper and lower surfaces where the heat flux is less. The heat pipes, though spaced further apart on the upper and lower surfaces, still provide a heated surface to radiate the heat away. The weight reduction from using alternating J-shaped heat pipes is significant. This arrangement of alternating J-shaped heat pipes is referred to as a partially interdigitated array of heat pipes and has the advantage of reducing weight but not significantly reducing the temperature of the surface that is radiating energy away.

Several techniques are possible for embedding the heat pipes in a composite material. The term embedding refers to one object at least partially enclosing a second object, such as heat pipes being embedded in C/C. However, the heat pipes do not need to be completely enclosed to be embedded in the C/C. The preferred embodiment consists of weaving a fabric preform and then inserting the heat pipes in the preform. An alternate embodiment involves weaving the fabric preform in place around the heat pipes. For heat pipes with a small leading-edge radius, inserting the heat pipes in a woven preform may result in a lower density of fibers in the through-the-thickness direction as the preform is stretched around the leading edge. If a reduction in fiber density occurs, the through-the-thickness thermal conductivity will be reduced, having detrimental effects on the operation of the thermal protection of the leading edge. Weaving the fabric preform around the heat pipes in place can avoid the problem of reduced fiber density resulting from a stretched preform. In either case, whether weaving a preform and inserting the heat pipes, or weaving around the heat pipes in place, it is important to have a large percentage of fibers in the through-the-thickness direction in the nose region to increase the through-the-thickness thermal conductivity. On the upper and lower surfaces, away from the nose region, the through-the-thickness thermal conductivity is not as important an issue. In these regions, it may be advantageous to orient the fibers such that the in-plane thermal conductivity normal to the heat pipes is large to efficiently transfer heat across the gap between the heat pipes. Since the heat pipes cannot tolerate the high temperatures at which the fibers are customarily heat treated, it is necessary to use fibers that do not have to be heat treated when weaving around the heat pipes in place. If a fabric preform is woven, and the heat pipes are inserted in the preform after weaving is complete, heat treating the fibers can take place after the weaving is complete and prior to insertion of the heat pipes in the preform.

Figure 6:
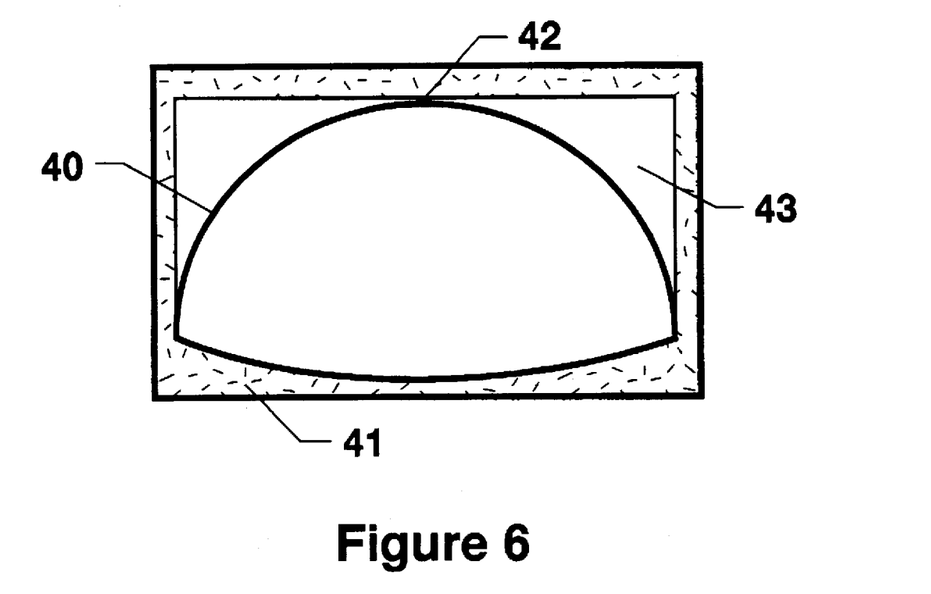
FIG. 6 is a schematic diagram of an alternate embodiment of a "D-shaped" cross-section heat pipe embedded in a composite material.
Figure 7:
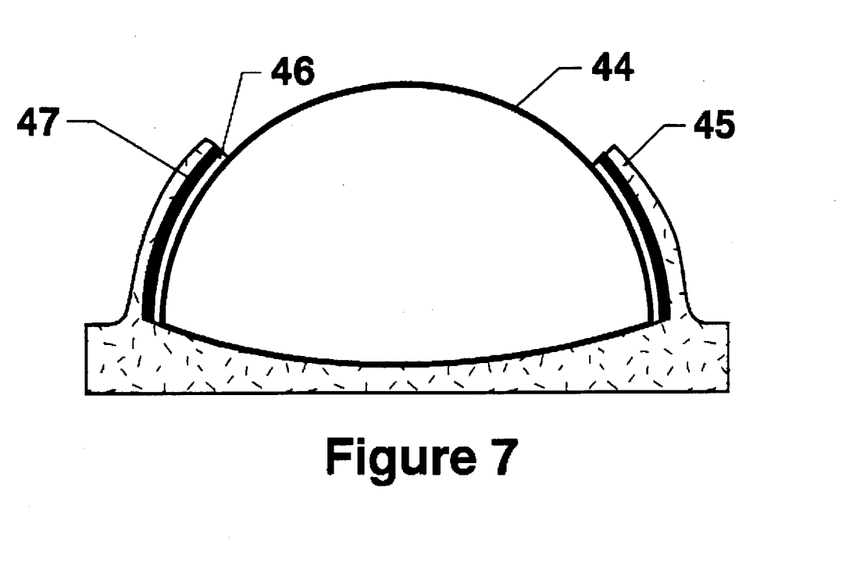
FIG. 7 is a schematic diagram of another alternate embodiment of a "D-shaped" cross-section heat pipe embedded in a composite material.

Two alternate methods for embedding the heat pipes in a composite material are shown in FIG. 6 and 7. In one method, the heat pipe 40 is embedded in a composite material with a rectangular cross-section 41. However, instead of using a graphite spacer, no spacer at all, or a very soft material such as an aerogel 43, is used. If no spacer is used, the inside surface of the composite material must be coated to protect it against oxidation. The heat pipe also has contact with the top layer of the composite material. The point contact 42 between the heat pipe and the composite material provides the force to keep the "flat" surface of the heat pipe in contact with the heated surface. When the heat pipe expands due to thermal expansion, the top surface of the composite material will flex (bow out) to allow the heat pipe to grow. Thus the top surface of the composite material serves two functions: 1) apply the necessary force to keep the "flat" surface of the heat pipe in contact with the heated surface, and 2) flex to allow growth of the heat pipe. A second alternate method of embedding the heat pipes in the composite material is shown in FIG. 7, where the composite material 45 does not fully surround the heat pipe 44, but it is still embedded in the composite material. Again, a compliant layer 46 and a gap forming layer 47 are included. As in the method discussed above, the composite material serves the same two functions, namely: 1) apply the necessary force to keep the "flat" surface of heat pipe in contact with the heated surface, and 2) flex to allow growth of the heat pipe. In both of these cases, it is necessary for the heat pipes to be coated to protect them from oxidation since the heat pipes will be directly exposed to oxygen.

The densification of the composite material can be performed by several different methods. However, all densification methods used must stay within the temperature (and thus pressure) limits of the heat pipes, which are usually less than the composite material. This restriction may prevent some additional processes, such as the graphitization of C/C to improve the thermal conductivity of the composite material. In the disclosure herein, the term densification refers to the method used to fabricate the composite material, and may vary depending on the type of material is used. Examples of refractory-composite materials that may be used are C/C, C/SiC, SiC/SiC, SiC/C, SiC/Si$_3$N$_4$, and C/Si$_3$N$_4$. Other materials such as metals, metal matrix composites, polymers, ceramics, and glasses could be used to contain the heat pipes. Densification of refractory-composite materials can begin with either a liquid or gas (such as CVD) impregnation.

An oxidation resistant coating is necessary on the surfaces of the composite material on both the inside and outside of the leading edge. Conversion coatings, where the outer layers of the composite are converted to an oxidation resistant coating may require temperatures that are in excess of the temperatures and pressures the heat pipe can tolerate without some degradation of the heat-pipe container material. An alternative is to deposit the coating on the surface with a technique such as chemical vapor deposition (CVD). The preferred coating materials are either silicon nitride or silicon carbide. Si$_3$N$_4$ will allow use over 3000° F. in an oxidizing environment. However, other carbides, nitrides, oxides, ceramic, or metallic coatings may also be used.

An alternative to densification of the composite material with the heat pipes embedded is to densify a fabric preform and bond or insert the heat pipes after densification. If the heat pipes are to be inserted after densification, they could only be inserted in the straight part of the leading edge since the heat pipes would not bend around the nose region of the leading edge. In addition, the heat pipes could be brazed to the composite material.

In some cases, it may be necessary to augment the external radiative cooling, i.e. thermal radiation from the outer surface of the leading edge to space, with internal cooling. This will occur if the heat input is too great to be radiated away to space within the temperature limits of the leading-edge materials. Radiative cooling to an actively cooled panel, or heat exchanger, inside the leading edge eliminates many of the thermal stress problems associated with convectively cooling the leading edge. An actively cooled panel can be placed inside the leading edge. The amount of heat radiated away is essentially doubled since both the inner and outer surfaces radiate heat to cool environments. The actively cooled heat exchanger can be attached to the wing box behind the leading edge to eliminate thermal stress problems associated with attaching a cooled heat exchanger to a hot surface.

The object of the present invention is a thermal protection system for leading edges consisting of refractory-metal heat pipes embedded in refractory-composite materials. Included in this is the technology of fabricating and embedding heat pipes in a composite material to fabricate leading edges of high-speed vehicles, and therefore provide a critical technology for actual flight. The techniques used to produce the leading edges are also capable of being used to fabricate other structures which involve high temperature, light weight, heat pipes with shapes that require joining thin gage refractory metals, and then embedding the tubes within a composite material.

While the above description contains many specificities, these should not be construed as limitations on the scope of the invention, but rather as an exemplification of one preferred embodiment thereof. Many other variations are possible, for example the use of a metal-matrix composite material instead of a refractory-composite material; the use of graphite/epoxy or other organic composite materials instead of a refractory-composite material; the use of heat-pipe container and wick materials other than Mo—Re; the use of a sintered-metal wick instead of a screen wick; the use of non arc cast materials; the use of silicon carbide or silicon nitride fibers instead of carbon fibers; the use of full-length instead of "J-shaped" heat pipes; the use of different length "J-shaped" heat pipes in the same leading edge; the use of a partially interdigitated array of straight heat pipes; the use of multiple arteries; the use of embedded cooling devices such as tubes for convective cooling, transpiration cooling, vapor chambers, or capillary pumped loops rather than for heat pipes; the use of bent instead of machined and joined curved sections; the use of alternate coatings on the heat pipe other than a silicide based coating; the use of strain isolators other than a soft flexible graphite material or a block of graphite; the use of an aerogel as a compliant layer; the use of an aerogel as a gap forming layer; the use of "non D-shaped" cross section tubes; the use of various materials for the gap forming layer; the use of multiple gap forming layers with different methods of removing the layers; the use of a melting and/or melting and evaporative layer as a gap forming layer; the use of pre-ceramic polymers for the gap forming layer, and the use of shapes other than a circular arc to create an initial imperfection in the "flat" surface to reduce the chance of buckling. Alternate applications of heat pipes embedded in a composite material include waste heat recovery from fossil or nuclear fuel power plants, radiators for rejecting heat in space, cooling turbine engine blades, first wall cooling for fusion reactors, and cooling the throat and/or nozzle section of jet, scramjet, ramjet, or rocket engines. Accordingly, the scope of the invention should be determined not by the embodiment illustrated, but by the appended claims and their legal equivalents. Various changes may be made in the details of the method and apparatus and certain features may be used without others. All such modifications within the scope of the appended claims are included in the invention.

What is claimed is:

1. A strain isolation system comprising:
   a first object, wherein the first object is a material selected from the group consisting of metals, glasses, composites, polymers, or ceramics;

a second object embedded within the first object, such that expansion or contraction of one object is restricted by the other object, wherein the second object is a material selected from the group consisting of metals, glasses, composites, polymers, or ceramics;

a gap forming means interposed between the first object and the second object such that the gap forming means is not located at a heat transfer interface, said gap forming means comprising a removable layer such that the removable layer dissipates upon heating to form a gap between the first object and the second object.

2. A strain isolation system comprising:

a first object, wherein the first object is a material selected from the group consisting of metals, glasses, composites, polymers, or ceramics;

a second object embedded within the first object, such that expansion or contraction of one object is restricted by the other object, wherein the second object is amaterial selected from the group consisting of metals, glasses, composites, polymers, or ceramics:

a gap forming means interposed between the first object and the second object such that the gap forming means is not located at not located at a heat transfer interface, said gap forming means comprising a shrinking layer such that the shrinking layer reduces in volume upon heating to form a gap between the first object and the second object.

3. A thermal protection system comprising:

a matrix, wherein the matrix is a material selected from the group consisting of metals, glasses, composites, polymers, or ceramics;

at least one heat pipe, wherein the heat pipe is embedded in the matrix and the heat pipe is a material selected from the group consisting of metals, glasses, composites, polymers, or ceramics;

a strain isolation means interposed between the heat pipe and the matrix such that the strain isolation means is not located at a heat transfer interface, wherein the strain isolation means further comprises a compliant layer.

4. A thermal protection system comprising:

a matrix, wherein the matrix is a material selected from the group consisting of metals, glasses, composites, polymers, or ceramics;

at least one heat pipe, wherein the heat pipe is D-shaped and the flat part of the D-shaped heat pipe is convex, the heat pipe is embedded in the matrix, and the heat pipe is a material selected from the group consisting of metals, glasses, composites, polymers, or ceramics;

a strain isolation means interposed between the heat pipe and the matrix.

5. A thermal protection system comprising:

a matrix, wherein the matrix is a material selected from the group consisting of metals, glasses, composites, polymers, or ceramics;

at least two heat pipes, wherein the heat pipes are embedded in the matrix and the heat pipes are arranged in a partially interdigitated array and the heat pipes are materials selected from the group consisting of metals, glasses, composites, polymers, or ceramics;

a strain isolation means interposed between the heat pipe and the matrix such that the strain isolation means is not located at a heat transfer interface.

* * * * *